(12) United States Patent
Mekki et al.

(10) Patent No.: US 12,549,162 B2
(45) Date of Patent: Feb. 10, 2026

(54) VOLTAGE RAMP GENERATOR

(71) Applicant: STMicroelectronics International N.V., Geneva (CH)

(72) Inventors: Abdessamed Mekki, Isere (FR); Laurent Simony, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 11 days.

(21) Appl. No.: 18/798,124

(22) Filed: Aug. 8, 2024

(65) Prior Publication Data

US 2025/0055447 A1 Feb. 13, 2025

(30) Foreign Application Priority Data

Aug. 9, 2023 (FR) ...................................... 2308606

(51) Int. Cl.
*H03K 4/02* (2006.01)
*H04N 25/77* (2023.01)
*H04N 25/78* (2023.01)

(52) U.S. Cl.
CPC ............. *H03K 4/023* (2013.01); *H04N 25/77* (2023.01); *H04N 25/78* (2023.01)

(58) Field of Classification Search
CPC .......... H03K 4/02; H03K 4/023; H03K 4/026; H04N 25/77; H04N 25/78
USPC ................................................ 327/126, 127
See application file for complete search history.

(56) References Cited

U.S. PATENT DOCUMENTS

| 2002/0067303 A1 | 6/2002 | Lee et al. |
| 2002/0122129 A1 | 9/2002 | Lee |
| 2019/0181754 A1* | 6/2019 | Ash ...................... H03M 1/0602 |
| 2023/0403019 A1* | 12/2023 | Simony ................... H03K 4/56 |

OTHER PUBLICATIONS

INPI Search Report and Written Opinion for priority application, FR Appl. No. 2308606, report dated Aug. 7, 2024, 12 pgs.
Oh-Bong Kwon et al: "A novel double slope analog-to-digital converter for a high-quality 640/spl times/480 CMOS imaging system", VLSI and CAD, 1999. ICVC 1 99. 6th International Conference On Seoul, South Korea Oct. 26-27, 1999, Piscataway, NJ, USA, IEEE, US, Oct. 26, 1999 (Oct. 26, 1999), pp. 335-338, XP010370102.

* cited by examiner

*Primary Examiner* — William Hernandez
(74) *Attorney, Agent, or Firm* — Crowe & Dunlevy LLC (57) ABSTRACT

A circuit includes a first capacitance array formed by n nominally equal capacitive elements. A first electrode of each capacitive element is coupled, via respective switches to either a reference voltage or ground. A differential amplifier has a first input coupled to an output of a first capacitance array, a second input grounded, and an output generating a voltage ramp. A capacitive feedback circuit couples the output of the differential amplifier to the first input. A second capacitance array has an output coupled to the first input of the differential amplifier. The capacitive elements of the first capacitance array are organized in sets. The circuit operates by controllably coupling, set by set, second electrodes of the capacitive elements of the first capacitance array to the first input of the differential amplifier.

15 Claims, 5 Drawing Sheets

VOLTAGE RAMP GENERATOR

PRIORITY CLAIM

This application claims the priority benefit of French Application for U.S. Pat. No. 2,308,606, filed on Aug. 9, 2023, the content of which is hereby incorporated by reference in its entirety to the maximum extent allowable by law.

TECHNICAL FIELD

The present disclosure relates generally to voltage ramp generators and corresponding methods and, more particularly, to ramp generators used in analog-to-digital converter (ADC) circuits. The present disclosure more specifically applies to image sensors.

BACKGROUND

Voltage ramp generators, particularly those powering ramp-type analog-to-digital converters in image sensors, are submitted to strict specifications, particularly in terms of noise, in terms of power supply voltage rejection ratio, or also in terms of non-linearity with respect to an ideal ramp. For example, it is desirable to obtain a relatively high signal to noise ratio (SNR) noise.

There is a need for a ramp generator having better performances than existing solutions in terms of noise.

There is a need to overcome all or part of the disadvantages of known ramp generators for digital-to-analog converters.

SUMMARY

An embodiment provides a circuit comprising: a first capacitance array comprising n nominally equal capacitive elements each having a first electrode coupled, via respective switches, to either a reference voltage or to ground; a differential amplifier having a first input coupled to an output of said first capacitance array, a second input grounded, and an output providing a voltage ramp; and a capacitive feedback circuit coupling the output of said differential amplifier to said first input; and a second capacitance array an output of which is coupled to the first input of the differential amplifier, wherein the input capacitive elements are organized in sets and second electrodes of the input capacitive elements are interconnected, set by set, and controllably couplable to said input of the amplifier.

An embodiment provides a method comprising: in a circuit comprising: a first capacitance array comprising n nominally equal capacitive elements each having a first electrode coupled, via respective switches to either a reference voltage or grounded; a differential amplifier having a first input coupled to an output of said first converter, a second input grounded, and an output providing a voltage ramp; a capacitive feedback circuit coupling the output of said differential amplifier to said first input; and a second capacitance array an output of which is coupled to the first input of the differential amplifier, the capacitive elements being organized in sets and the method further comprising controllably coupling, set by set, second electrodes of the capacitive elements to said first input of the amplifier.

According to an embodiment, the capacitive elements are organized in m sets of $n/(2^j)$ capacitive elements, j ranging from 1 to m, plus one set of $n/(2^m)$ capacitive elements, where $2^m$ represents a maximum conversion gain.

According to an embodiment, the switching of the capacitive elements is made at a given frequency to define voltage steps in the output signal of the differential amplifier, the duration of steps of the first capacitance array corresponds to the duration of the steps of the second capacitance array multiplied by a conversion gain.

According to an embodiment, the gain conditions the number of sets coupled to the first input of amplifier.

According to an embodiment, the second capacitance array provides steps having an amplitude corresponding to the main digital-to-analog converter (DAC), divided by the conversion gain.

According to an embodiment, the sets of capacitive elements of the first capacitance array are in parallel, m switches coupling individually each of the m first sets to the first input of the amplifier and said one set of $n/(2^m)$ capacitive elements is permanently connected to said first input.

According to an embodiment, each of the m first sets of capacitive elements of the first capacitance array is coupled to the set of capacitive elements of higher rank j by a switch and said one set of $n/(2^m)$ capacitive elements is permanently connected to said first input.

According to an embodiment, the frequency of the output steps remains the same for all conversion gains.

An embodiment provides a voltage ramp generator comprising a circuit as described.

An embodiment provides a digital-to-analog converter comprising a voltage ramp generator as described.

An embodiment provides an image sensor comprising at least one digital-to-analog converter as described.

BRIEF DESCRIPTION OF THE DRAWINGS

The foregoing features and advantages, as well as others, will be described in detail in the following description of specific embodiments given by way of illustration and non-limiting with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps, operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially", "nominally equal" and "in the order of" signify within 10%, and preferably within 5%.

Figure 1:
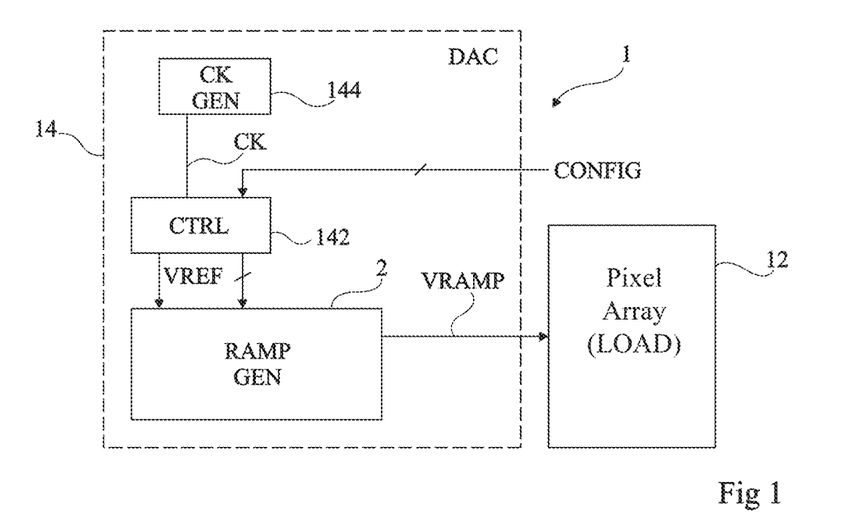
FIG. 1 schematically represents an electronic device, for example, an image sensor.

FIG. 1 schematically represents an electronic device, for example, an image sensor 1.

Image sensor 1 comprises, among others, a pixel array 12 and a digital-to-analog converter (DAC) 14, the pixel array 12 being coupled to an output of converter 14 providing a voltage ramp VRAMP. The voltage ramp is, for example, used by single-slope analog-to-digital converters (not illustrated) of the pixel array 12, configured to convert analog voltage levels of the pixels into digital values. In other embodiments, where device 1 is not an image sensor, the element bearing reference number 12 is a load to be powered with a voltage ramp or a circuit using a voltage ramp, and comprising or not ramp-type analog-to-digital converters.

Digital-to-analog converter 14 comprises a voltage ramp generator 2 (RAMP GEN) providing the voltage ramp VRAMP, controlled by a controller 142 (CTRL). Ramp generator 2 is a switched capacitance ramp generator and controller 142 is configured to provide control signals to the ramp generator 2 based on: a clock signal CK provided by a clock generator 144 (CK GEN); a digital value CONFIG fixing the magnitude, slope, timing, ramp offset, etc., of the voltage ramp VRAMP; and a voltage VREF conditioning, with other parameters, the slope of the ramp.

Figure 2:
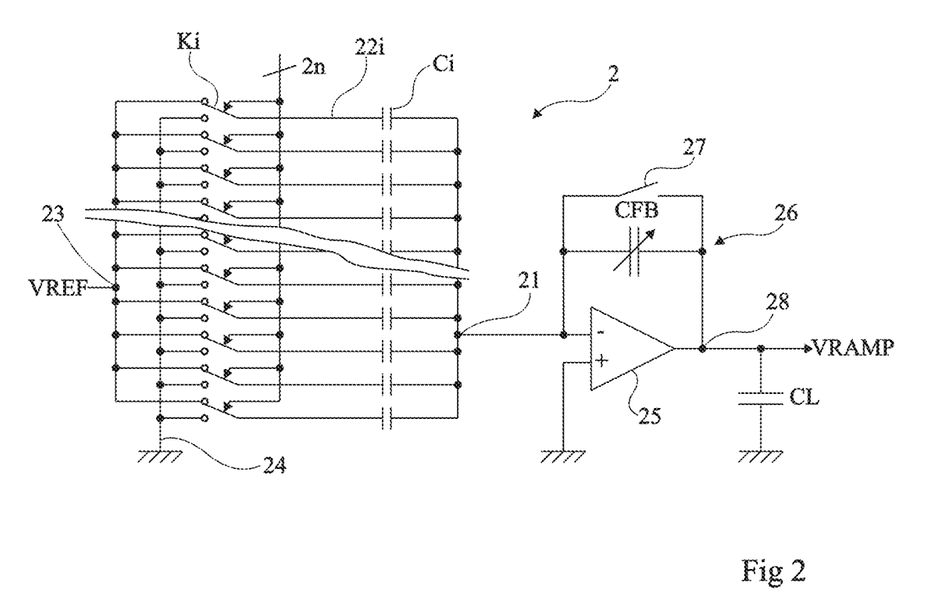
FIG. 2 schematically represents an embodiment of a switched capacitance ramp generator.

FIG. 2 schematically represents an embodiment of a switched capacitance ramp generator 2.

Ramp generator 2 comprises a plurality of capacitive elements Ci, for example n capacitive elements Ci, with i ranging from 1 to n, having respective first electrodes 22$i$ coupled, via respective switches Ki either to a node 23 or to a node 24, and a common second electrode, or their respective second electrodes, connected to a common node 21. Node 23 is configured to receive a dc voltage, for example a positive voltage VREF, from control circuit 142. Node 24 is configured, in this example, to be grounded. As an alternative, node 24 also receives a voltage provided by control circuit 142. Common node 21 is connected to an inverting (−) input of a differential amplifier 25. A non-inverting input (+) of amplifier 25 is coupled, preferably connected, to ground. Amplifier 25 is associated with a capacitive feedback circuit 26. Feedback circuit 26 comprises, in this example, a variable capacitive element CFB coupling an output node 28 of amplifier 25 to its inverting input (−). Output node 28 of amplifier 25 is preferably coupled to ground through a filtering capacitor CL.

A voltage ramp is generated by successively switching switches Ki from ground to VREF to, at each step, transfer an additional charge to feedback capacitor CFB in order to progressively decrease or increase the output voltage of the amplifier. Capacitive element CL filters the staggered ramp to obtain an approximate linear ramp VRAMP. Assuming that all capacitive elements Ci have the same value Cin, the maximum variation (in absolute value) of the voltage ramp VRAMP corresponds to |VREF*n*Cin/CFB|. Controller 142 includes, for example, a finite state machine operating as a shift register to successively control switches Ki, each switching operation transferring a charge of VREF*Cin to the capacitive element CFB. In the above and following description, when we refer to the amplitude value of the steps, we mean the absolute value of that amplitude.

A reset of the ramp can be made, for example, by short-circuiting, via a switch 27, capacitive element CFB and by grounding all capacitive elements Ci via their respective switches Ki.

Changing the sign of the ramp slope can be obtained with the same circuitry by swapping the switching order from ground to reference voltage VREF or inversely.

The above circuitry is disclosed more in detail in United States Patent Application Publication No. 2023/0403019, corresponding to French Application for Patent No. FR2204819, filed on May 20, 2022, the contents of which are incorporated herein by reference to the extent authorized by Law.

In some applications and in particular in image sensors, it is desirable to change the conversion gain of the ramp, i.e., its slope (where the conversion gain is inversely proportional to the average slope), for example, considering the level of luminosity of the scene in order to adjust the full range of the sensor. The conversion gain of 1 corresponds to the maximum slope of the ramp that is needed to convert the maximum amplitude of the read signal coming from the whole pixel array. If the maximum signal amplitude of the image is G times smaller than the maximum amplitude defined above, the ramp amplitude, hence its slope, can be divided by G, so that after analog-to-digital conversion, the distribution of the digital codes still reaches the maximum code value. In such a case, the conversion gain is G. The main values of conversion gains are powers of 2, but intermediate values may also exist.

Such an adjustment can be made by changing the value of the feedback capacitor CFB as disclosed by the Publication No. 2023/0403019 mentioned above, or by changing the value of the reference voltage VREF provided by controller 142 to node 23 and/or node 24.

The noise of the ramp contributes to the noise known as "line noise" in image sensors, which is a critical parameter for the image quality.

The disclosed embodiments provide a new approach aiming at reducing the noise, and therefore reducing the line noise in CMOS Image Sensors (CIS), while keeping the possibility to adjust the conversion gain or slope of the ramp, for conversion gain greater than 1.

The RMS noise of ramp generator 2 corresponds to the square root of $K*(1+C_{in\_total}/CFB)$, where K is a factor, which mainly depends on features of amplifier 25 and on the capacitance of capacitive element CL.

According to the present disclosure, when the conversion gain of the ramp needs to be increased (the slope needs to be inversely decreased), the number of input capacitive elements Ci used for generating the ramp is reduced. Doing so, the total capacitance Cin_total, seen at the input of amplifier 25, may be reduced by disconnecting the unused capacitance, which contributes to reduce the noise.

For example, for changing the conversion gain from 1 to 2, only half of the capacitive elements Ci is needed to produce the expected output swing. The capacitive elements, which are not used, are disconnected, i.e., the other half of capacitive elements Ci is disconnected from the input of amplifier 25. The amplitude of the ramp is therefore reduced from VREF*n*Cin/CFB to VREF*(n/2)*Cin/CFB. The total capacitance seen at the input of the amplifier 25 is divided by 2, which reduces the output noise.

However, the number of steps is also divided by 2, which impacts the ramp frequency, given that the duration of the ramp should remain the same. If the conversion gain is modified, only the slope of the ramp should change, and the number of steps, hence the frequency, should remain the same. However, by default, if one uses only for example half of the capacitive elements, the number of steps is divided by two because to one step corresponds one capacitive element. In order to maintain the same number of steps as for a nominal conversion gain using all capacitive elements, an intermediate step is added. In other words, a half step of amplitude VREF/2*Cin/CFB is added to each step of the ramp generated by the n/2 capacitive elements. The frequency of the half steps for a conversion gain of two corresponds to the frequency of the steps for a conversion gain of 1.

More generally, for increasing the conversion gain by a factor G, n/G capacitive elements are used for generating a ramp. The amplitude of the ramp is therefore VREF*(n/G)*in/CFB and G (considering that the 1$^{st}$ of these intermediate steps is equal to zero) intermediate steps are added to each step generated by the n/G capacitive elements. The frequency of the intermediate steps corresponds to the frequency of the steps for a conversion gain of 1.

This corresponds to use a "main" capacitive digital to analog converter (main DAC) for generating a first ramp of n/G steps and to sum this first ramp to a second ramp of G steps generated by a "sub" capacitive digital to analog converter (sub-DAC), the frequency of the first main converter being G time lower than the frequency of the sub-converter.

Figure 3:
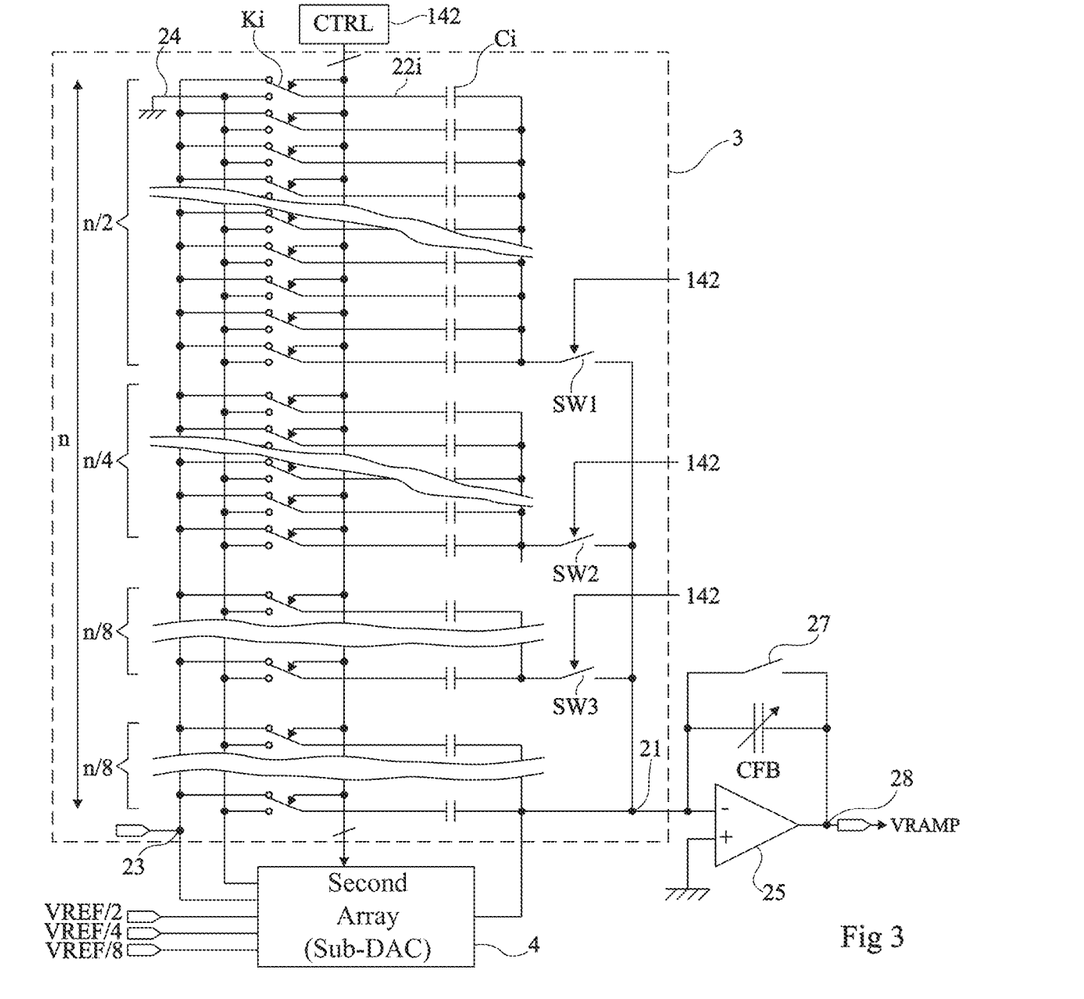
FIG. 3 represents, very schematically, an embodiment of a voltage ramp generator.

FIG. 3 represents, very schematically, an embodiment of a voltage ramp generator.

The embodiment of FIG. 3 shows a switchable array 3 configured to operate with four conversion gains, respectively a nominal or unitary conversion gain 1, and conversion gains 2, 4 and 8 resulting in reduced slopes with respect to the unitary conversion gain. The nominal conversion gain corresponds to the conversion gain of ramp generator 2 based on reference voltage VREF and on the n capacitive elements Ci.

As for the embodiment of FIG. 2, a first electrode $22i$ of each capacitive element Ci is coupled by a switch Ki to either node 23 or node 24. Node 23 is configured to receive voltage VREF. Node 24 is configured to be grounded.

Still as for the embodiment of FIG. 2, an output 21 of the capacitive array 3 is coupled, preferably connected, to the inverting input (−) of differential amplifier 25. Differential amplifier 25 has its output 28 providing the voltage ramp VRAMP coupled to its inverting input by feedback capacitor CFB (preferably variable) and by reset switch 27 in parallel, and its non-inverting input (+) grounded.

According to the embodiment of FIG. 3, the array 3 (or main array) of n capacitors is divided in 4 sets of respectively and approximately n/2, n/4, n/8 and n/8 capacitive elements Ci, the second electrodes of the capacitive elements Ci of each of the three first sets (n/2, n/4, n/8 capacitive elements) being interconnected to a respective switch SW1, SW2, SW3 to be coupled to node 21 (or output of array 3), i.e. to the inverting input of amplifier 25, the n/8 capacitive elements of the fourth set having their respective second electrodes preferably directly interconnected to node 21. Switches SW1, SW2 and SW3 are controlled by circuit 142 depending on the desired conversion gain.

In addition to the array 3, another array 4 of capacitive elements is provided for generating a second sub-ramp at node 21 to be added to the ramp generated by array 3. This second array 4 can be considered as a sub-DAC for dividing each step of the main DAC 3 in G sub-steps (1$^{st}$ sub-step being zero), where G represents the conversion gain. In the embodiment represented in FIG. 3, the sub-DAC receives from circuit 142 intermediate reference voltages VREF/2, VREF/4 and VREF/8. According to an alternative embodiment, these intermediate voltages are generated internally based on voltage reference VREF.

Example embodiments of the sub-DAC 4 will be described later in relation to FIGS. 5 to 8.

For generating a ramp with conversion gain 1, all switches SW1, SW2 and SW3 are closed and all switches Ki, i.e., all capacitive elements Ci are used and participate in the generation of the ramp. The sub-DAC is not operating, i.e., the amplitude and period of the respective steps generated by the main array 3 or main DAC are not divided. This corresponds to the operation disclosed with FIG. 2.

For generating a ramp with conversion gain 2, switch SW1 is, for example, open and switches SW2 and SW3 are closed. The number of capacitive elements involved in the generation of the main ramp is therefore n/2. The sub-array 4 or sub-DAC generates a periodic signal alternating periods of amplitude 0 and periods of amplitude VREF/2*Cin/CFB. This corresponds to generating a ramp (sub-ramp) of amplitude VREF/2*Cin/CFB by steps of amplitudes 0 and VREF/2*Cin/CFB. The frequency of the sub-ramp corresponds to the nominal frequency of the ramp generator, i.e., the frequency of the clock signal used for a conversion gain of 1. The frequency of the clock signal used for the main ramp, conditioning the duration of the steps of the main ramp, is divided by 2.

Figure 4:
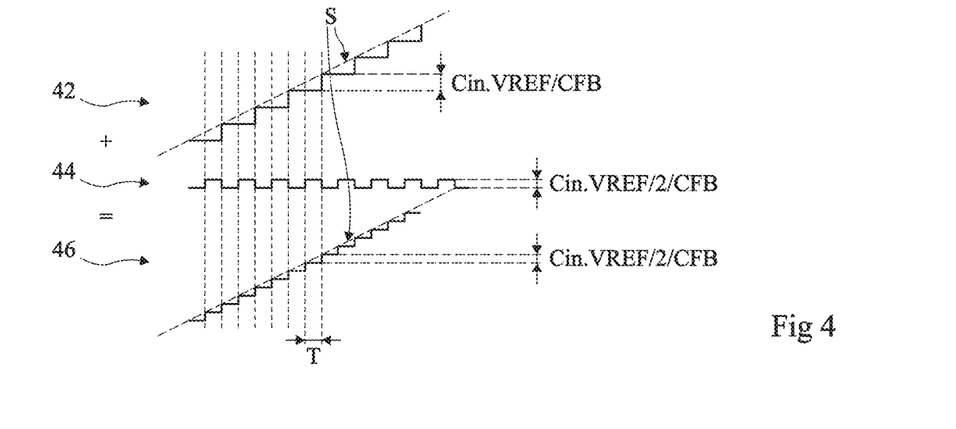
FIG. 4 illustrates the operation of the ramp generator of FIG. 3.

FIG. 4 illustrates the operation of the ramp generator of FIG. 3 for a conversion gain of 2.

FIG. 4 illustrates at reference 42 the ramp generated by the array 3, using half of the capacitive elements and a control frequency divided by two as compared to the (nominal) frequency leading to the expected step duration (2*T) for the first RAMP. FIG. 4 further illustrates at reference 44 the signal provided by the array 4, corresponding to a pulse train of amplitude |Cin*VREF/2| and of frequency corresponding to the frequency leading to the expected step duration T. FIG. 4 further illustrates the resulting voltage ramp 46 obtained by summing the respective contributions of arrays 3 and 4 at node 21.

The amplitude of each step of the ramp 42 corresponds to Cin*VREF. Summing ramps 42 and 44 then results in a ramp 46 in which each step has an amplitude of Cin*VREF/2.

An advantage of the disclosed embodiment is that the slope S of the ramp has then been divided by two with respect to an operation with conversion gain 1, but the number of steps has been preserved.

Furthermore, as only half of the capacitive elements has been used, the total capacitance seen by the amplifier is nominally divided by two, which contributes to the reduction of the noise and of the output impedance.

For generating a ramp with a conversion gain of 4, i.e., with a slope divided by 4 with respect to a ramp generated by the circuitry of FIG. 2, switches SW1 and SW2 are open and switch SW3 is closed. The sub-array 4 generates a ramp of four steps each having an amplitude of VREF/4 (the 1st step being zero). The frequency of the clock controlling the n/4 remaining switches Ki of the array 3 is divided by 4 with respect to the nominal frequency and the frequency used for controlling the sub-DAC 4 corresponds to the nominal frequency.

For generating a ramp with a conversion gain of 8, all switches SW1, SW2 and SW3 are open and the sub-DAC 4 generates a ramp of eight steps each having an amplitude of VREF/8.

More generally, the main array 3 of n capacitive elements Ci of the main DAC is distributed in m+1 sets of capacitive elements Ci, where $2^m$ represents the maximum conversion gain of the ramp generator, namely m sets of $n/(2^j)$ capacitive elements, j ranging from 1 to m, connectable via switches SWj to node 21, plus an additional set m+1 of $n/(2^m)$ capacitive elements preferably permanently connected to node 21. The sub-DAC 4 is configurable to generate a sub-ramp of $2^j$ steps and is therefore capable of generating m sub-ramps. The duration of the steps generated by the sub-DAC 4 is independent of the conversion gain and corresponds to the nominal frequency f, leading to a ramp VRAMP made of steps having a duration of T. The duration of the steps of the main-DAC 3 corresponds to G*T, where $G=2^m$.

Figure 5A:
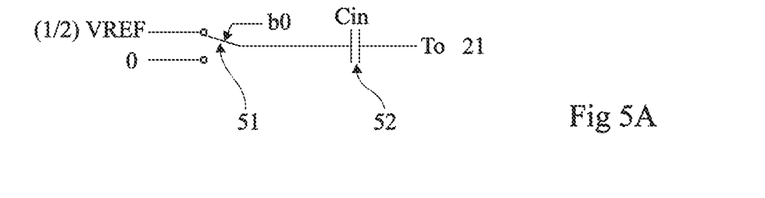
FIG. 5A and FIG. 5B represents two equivalent details of the ramp generator of FIG. 3.
Figure 5B:
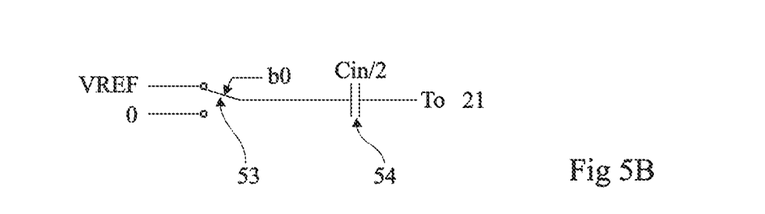

FIGS. 5A and 5B represent two equivalent embodiments for generating a sub-ramp for a conversion gain of 2, i.e., to be associated with a main ramp using half of the capacitive elements Ci of the main array 3.

In the embodiment of FIG. 5A, the sub-DAC 4 receives, in addition to ground, a voltage corresponding the half (½) VREF of the reference voltage VREF. A switch 51, controlled by a binary signal b0, couples a first electrode of a capacitive element 52 having a capacitance Cin either to a node at VREF/2 or to ground. The second electrode of capacitive element 52 is coupled, preferably connected, to node 21.

In the embodiment of FIG. 5B, the sub-DAC receives, in addition to ground, the voltage VREF. A switch 53, controlled by a binary signal b0, couples a first electrode of a capacitive element 54 having a capacitance Cin/2 either to a node at VREF or to ground. The second electrode of capacitive element 51 is coupled, preferably connected, to node 21.

When the desired conversion gain of the ramp generator is 1, the position of switch 51 or 53 has no impact provided that it remains the same for the generation of the ramp provided by the main DAC.

Figure 6:
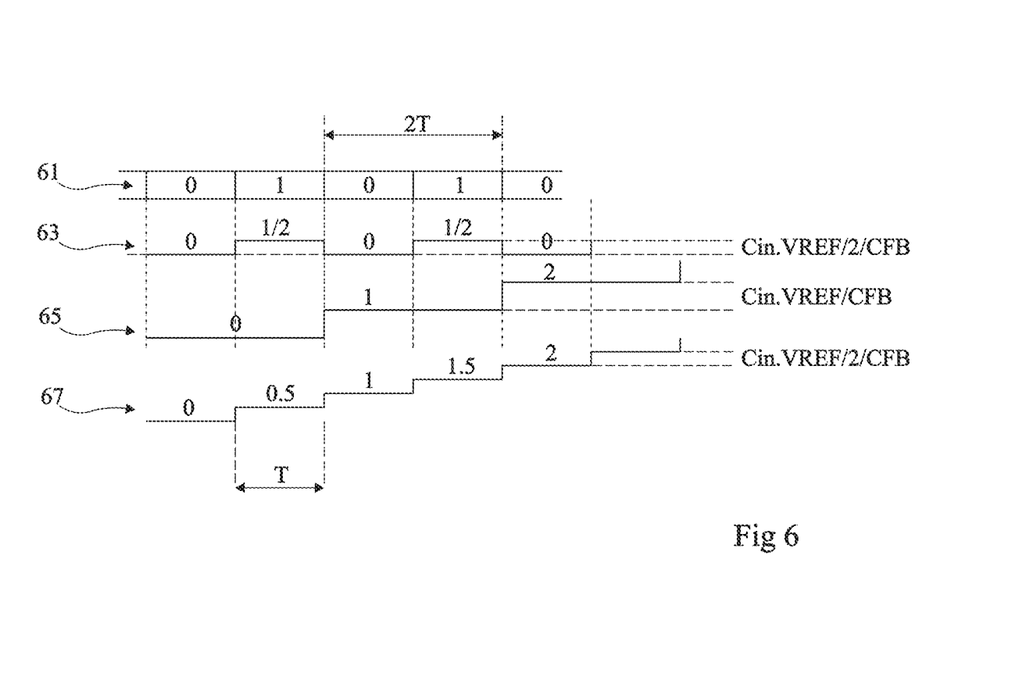
FIG. 6 illustrates the operation of the ramp generator in the embodiment of FIGS. 5A and 5B.

FIG. 6 illustrates the operation of the sub-DAC of FIG. 5A or 5B and the resulting ramp once added to the ramp generated by the main DAC 3.

FIG. 6 shows an example of control signal b0 (reference 61), the corresponding signal provided by the sub-DAC 4 (reference 63) with an amplitude of VREF/2, the signal provided by the main DAC 3 (reference 65) with steps having an amplitude of VREF and a duration of 2 T, and the resulting signal 67 with steps of amplitude VREF/2 and of duration T.

Figure 7A:
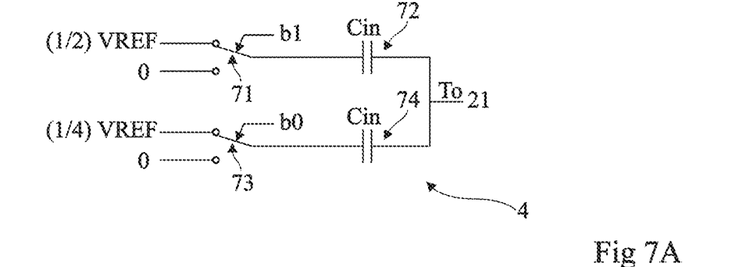
FIG. 7A and FIG. 7B represent two equivalent details of the ramp generator of FIG. 3 respectively according to a binary approach and to a thermometric approach.
Figure 7B:
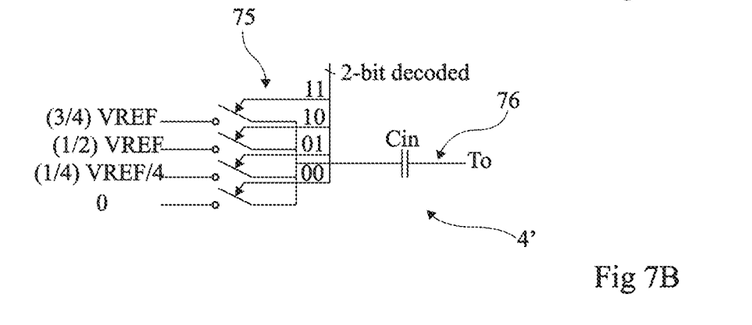

FIGS. 7A and 7B show two equivalent embodiments for generating a sub-ramp for a conversion gain of 4, i.e., to be associated with a main ramp using a fourth of the capacitive elements Ci of the main array 3.

In the embodiment of FIG. 7A, the sub-DAC 4 receives, in addition to ground, two voltages respectively corresponding to the half (½) VREF of the reference voltage VREF and to the fourth (¼) VREF of the reference voltage VREF. A switch 71, controlled by a binary signal b1 (or Most Significant Bit of a 2-bit signal), couples a first electrode of a capacitive element 72 having a capacitance Cin either to the node at VREF/2 or to ground. A switch 73, controlled by a binary signal b0 (or Least Significant Bit of a 2-bit signal), couples a first electrode of a capacitive element 74 having a capacitance Cin either to the node at VREF/4 or to ground. The second electrodes of capacitive elements 72 and 74 are interconnected to node 21.

In the embodiment of FIG. 7B, the sub-DAC 4 receives, in addition to ground, three voltages having respectively the amplitudes (¼) VREF, (½) VREF and (¾) VREF. The four voltages (0, VREF/4, VREF/2, 3VREF/4) are individually coupled via an array 75 of four switches to a first electrode of a single capacitive element 76 having a capacitance Cin. The array 75 is controlled by a 2-bit decoded signal. The second electrode of capacitive element 76 is coupled, preferably connected, to node 21.

The embodiment of FIG. 7A corresponds to a so-called binary DAC and the embodiment of FIG. 7B corresponds to a so-called thermometric DAC.

When the desired conversion gain of the ramp generator is 1, the position of switch 71 or 73, or of the switches of the array 75, has no impact provided that it remains the same for the generation of the ramp provided by the main DAC.

When the desired conversion gain of the ramp generator is 2, only switch 71, or positions VREF/2 and ground of array 75, are used, and switch 73 or positions 3VREF/4 and VREF/4 of array 75 remain in a fixed position.

Figure 8:
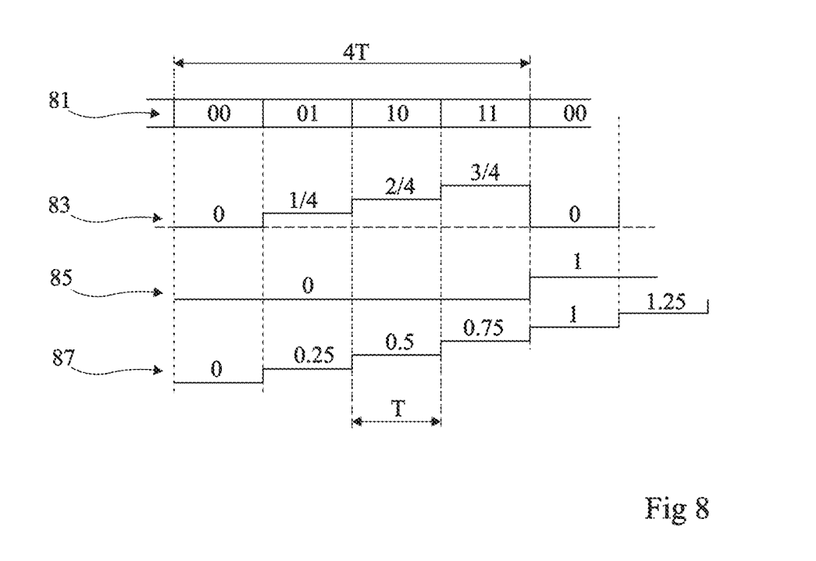
FIG. 8 illustrates the operation of the ramp generator in the embodiment of FIGS. 7A and 7B.

FIG. 8 illustrates the operation of the sub-DAC of FIG. 7A or 7B and the resulting ramp once added to the ramp generated by the main DAC 3.

FIG. 8 shows an example of decoded control signal 81, the corresponding signal 83 provided by the sub-DAC 4, the signal 85 provided by the main DAC 3 with steps having a duration of 4T, and the resulting signal 87 with steps of amplitude VREF/4 and of duration T.

The embodiments disclosed in FIGS. 7A and 7B can be extended to any number of bits depending on the desired conversion gain for the ramp generator.

Figure 9:
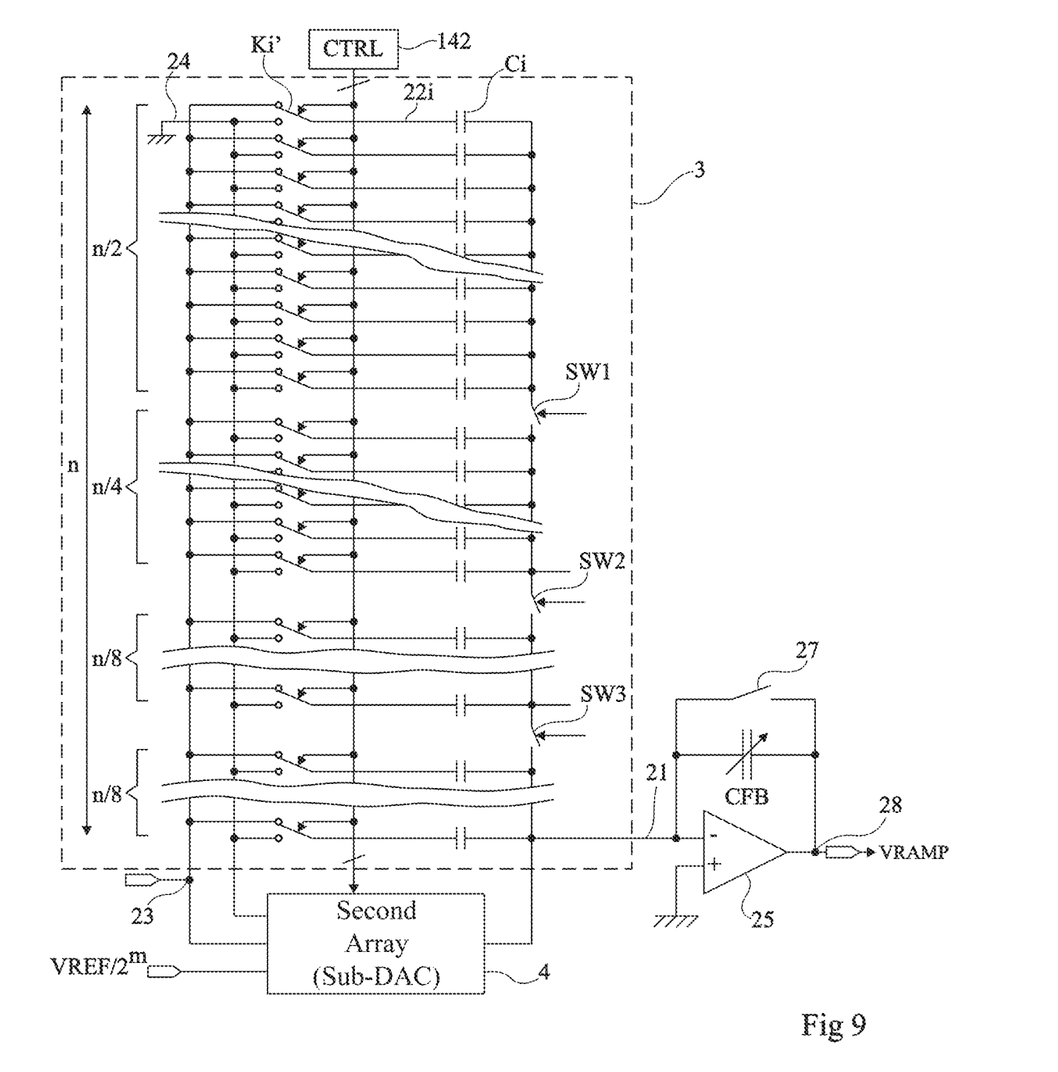
FIG. 9 schematically represents an alternative embodiment of a voltage ramp generator.

FIG. 9 represents an alternative embodiment to FIG. 3 in which the output of the capacitive elements Ci of the main array 3 are connected in series via switches SW1, SW2 and SW3 instead of in parallel as in FIG. 3.

The operation of the embodiment of FIG. 9 is identical to the operation of the embodiment of FIG. 3, all switches SW1, SW2 and SW3 being closed for a conversion gain of 1, switch SW1 being open for a conversion gain of 2, switches SW1 and SW2 being open for a conversion gain of 4 and all switches SW1, SW2 and SW3 being open for a conversion gain of 8.

The principle as described above can be applied to a different number of capacitive elements provided to adapt to the different ratios and operating conditions.

Furthermore, the disclosed solution can be combined to the solution of using several values for the feedback capacitance as disclosed in Publication No. 2023/0403019 mentioned above.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, the adaptation of controller 142 to generate the appropriate control signals to the various switches is in the abilities of one with an ordinary skill in the art based on the above description.

The invention claimed is:

1. A circuit, comprising:
a first capacitance array comprising n nominally equal input capacitive elements each having a first electrode coupled, via respective switches, to one of a reference voltage or ground;
a differential amplifier having a first input coupled to an output of the first capacitance array, a second input coupled to ground, and an output providing a voltage ramp; and
a capacitive feedback circuit coupling the output of said differential amplifier to the first input of the differential amplifier; and
a second capacitance array having an output coupled to the first input of the differential amplifier;
wherein the input capacitive elements are organized in sets and second electrodes of the input capacitive elements are interconnected, set by set, and controllably couplable to the first input of the differential amplifier.

2. The circuit of claim 1, wherein the input capacitive elements are organized in m sets of $n/(2^j)$ capacitive elements, j ranging from 1 to m, plus one set of $n/(2^m)$ capacitive elements, where $2^m$ represents a maximum conversion gain.

3. The circuit of claim 2, wherein a conversion gain conditions the number of sets coupled to the first input of amplifier.

4. The circuit of claim 3, wherein the second capacitance array provides steps having an amplitude corresponding to a main digital to analog converter (DAC), divided by the conversion gain.

5. The circuit claim 3, wherein the sets of input capacitive elements of the first capacitance array are in parallel, m switches coupling individually each of the m first sets to the first input of the differential amplifier and said one set of $n/(2^m)$ capacitive elements is permanently connected to said first input.

6. The circuit of claim 5, wherein each of the m first sets of capacitive elements of the first capacitance array is coupled to the set of capacitive elements of higher rank j by a switch and said one set of $n/(2^m)$ capacitive elements is permanently connected to said first input.

7. The circuit of claim 3, wherein a frequency of output steps in the voltage ramp remains the same for all conversion gains.

8. The circuit of claim 1, wherein a switching of the input capacitive elements is made at a given frequency to define voltage steps in the output signal of the differential amplifier, a duration of steps of the first capacitance array corresponding to a duration of steps of the second capacitance array multiplied by a conversion gain.

9. The circuit of claim 8, wherein the conversion gain conditions a number of sets of input capacitive elements which are coupled to the first input of the differential amplifier.

10. The circuit of claim 8, wherein the second capacitance array provides steps having an amplitude corresponding to a main digital to analog converter (DAC), divided by the conversion gain.

11. The circuit of claim 8, wherein a frequency of output steps in the voltage ramp remains the same for all conversion gains.

12. The circuit of claim 1, wherein the input capacitive elements are organized in sets and further comprising control circuitry configured to controllably couple, set by set, second electrodes of the input capacitive elements to said first input of the amplifier.

13. A voltage ramp generator comprising the circuit according to claim 1.

14. A digital-to-analog converter comprising the voltage ramp generator according to claim 13.

15. An image sensor comprising at least one digital-to-analog converter according to claim 14.

* * * * *